(No Model.) 4 Sheets—Sheet 1.
J. F. STEWARD.
CORN HARVESTER.
No. 398,860. Patented Mar. 5, 1889.
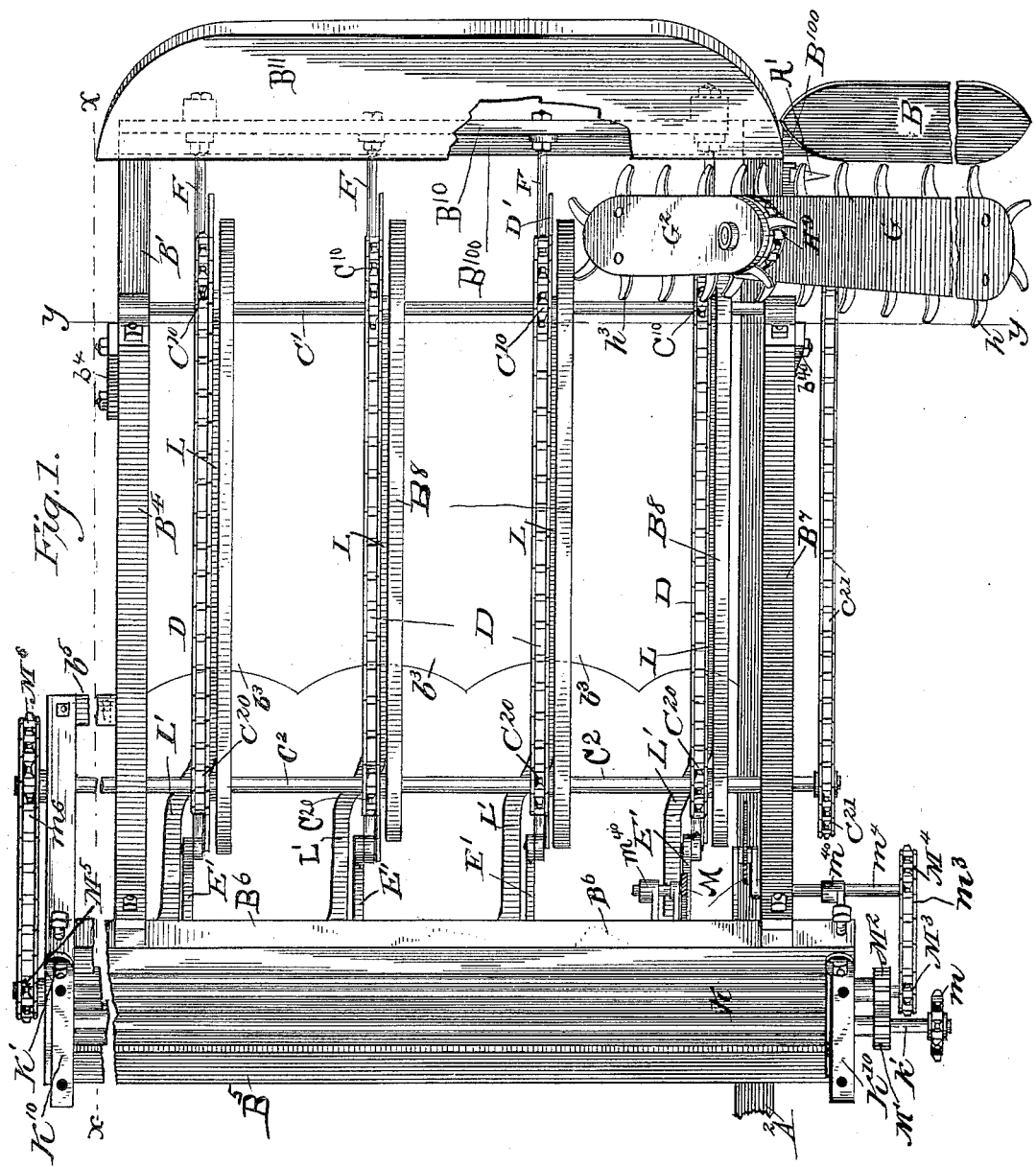
Witnesses:
Arthur Johnson
Jean Elliott
Inventor:
John F. Steward
By Burton & Burton
his attys

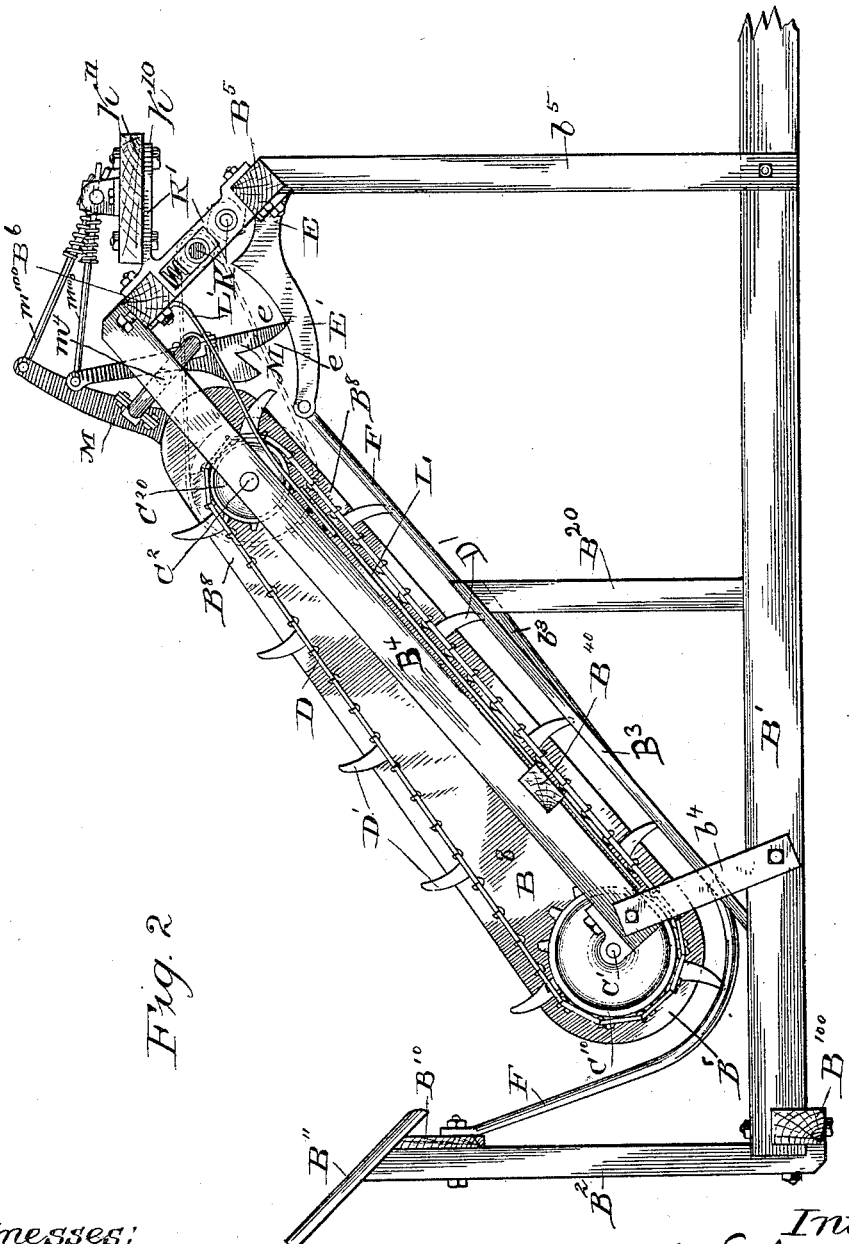

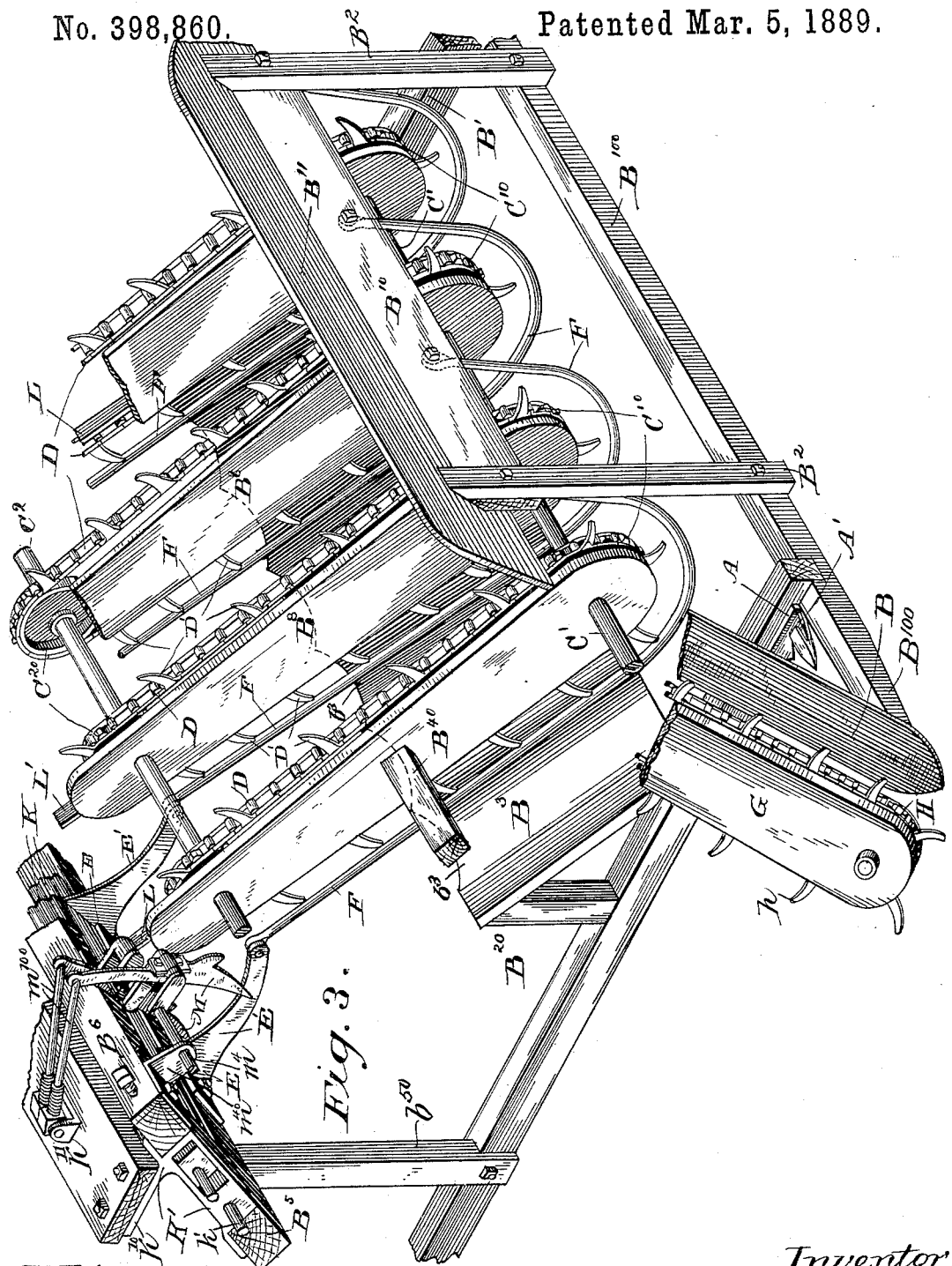

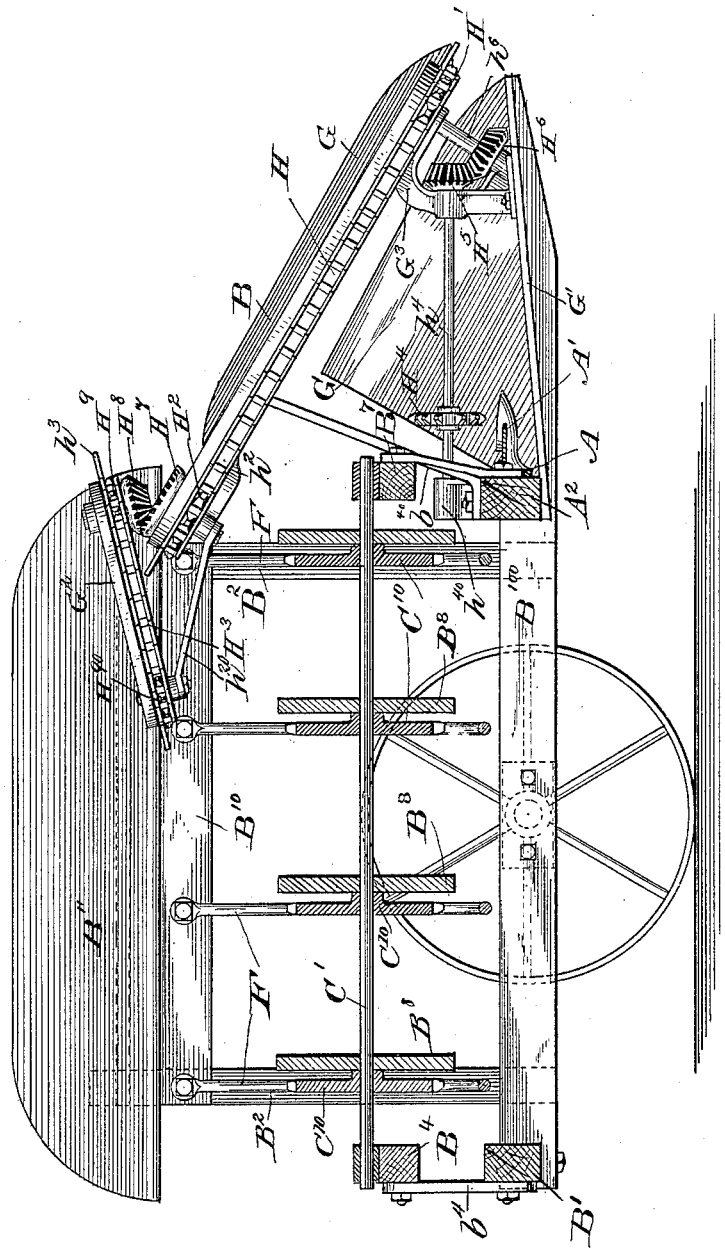

UNITED STATES PATENT OFFICE.

JOHN F. STEWARD, OF CHICAGO, ILLINOIS.

CORN-HARVESTER.

SPECIFICATION forming part of Letters Patent No. 398,860, dated March 5, 1889.

Application filed February 23, 1888. Serial No. 265,343. (No model.)

*To all whom it may concern:*

Be it known that I, JOHN F. STEWARD, a citizen of the United States, residing at Chicago, in the county of Cook and State of Illinois, have invented certain new and useful Improvements in Corn-Harvesters, which are fully set forth in the following specification, reference being had to the accompanying drawings, forming part thereof.

Figure 1 is a plan of the gathering, cutting, and conveying mechanism of a corn-harvester embodying my invention, such portions of the frame being shown as are necessary to support said mechanism. Fig. 2 is a vertical section looking forward at the plane of the line $x$ $x$ on Fig. 1. Fig. 3 is a perspective from the forward grainward corner, looking stubbleward and rearward, of substantially the parts shown in Fig. 1, some portions being broken away to show others more clearly. Fig. 4 is a stubble side elevation of the stubbleward divider-frame and gatherer, showing said parts only in general form, many details being omitted, the view including portions of the harvester-frame as cut by a vertical plane at the line $y$ $y$ on Fig. 1.

The purpose of this invention is to facilitate the reception and delivery to either husking or binding mechanism of the stalks of corn severed by the cutting mechanism of the corn-harvester.

It consists in providing a novel form of receptacle for the stalks as they fall after being severed, and in the novel relation thereto of the gathering mechanism, and in the combination, with such receptacle, of a certain elevating mechanism.

In the drawings, A is the finger-bar. A' is the sickle. $A^2$ is the front sill; B', the rear sill. The grainward divider-frame comprises the sill $B^{100}$, which is secured to the rear sill, B', and to the front sill, $A^2$; the divider B, which is secured to the forward end of the sill $B^{100}$, and from said point of fastening extends slightly upward and backward above said sill; the upright posts $B^2$ $B^2$, which are secured to the sill $B^{100}$, the foremost of said posts being a little in the rear of the rear end of the divider B; the fore-and-aft bar $B^{10}$, which is secured to said posts $B^2$ $B^2$ and extends substantially parallel to the sill $B^{100}$ above said sill, and the board $B^{11}$, which is secured upon the upper ends of the posts $B^2$ in an oblique position as to its breadth, sloping downward and stubbleward from its grainward edge.

To the rear sill, B', there is secured the upright post $B^{20}$, which is located at a distance stubbleward from the grainward divider, and a similar post is similarly located with respect to the front sill, and to the upper end of said posts there is secured the plank $B^3$, which occupies an inclined position slanting from the top of the posts downward and grainward to the sills, upon which its grainward end rests some distance stubbleward from the inside or stubbleward divider.

To the rear sill, B', there are secured posts $b^4$ $b^5$, which support the elevator or conveyer frame and mechanism, hereinafter particularly described. At the forward side of the machine the posts $b^{40}$ $b^{50}$ serve a similar purpose. To the upper ends of the posts $b^5$ $b^{50}$ there is secured the cross-bar $B^5$, and to said cross-bar, at its ends, respectively, there are secured the brackets K', which extend upward, leaning grainward, and at their upward grainward ends are connected by the cross-bar $B^6$, parallel to the bar $B^5$. To said bar $B^6$ there is secured at the rear end the elevator rear frame-bar, $B^4$, whose lower and grainward end is secured to the upper end of the short post $b^4$, a forward elevator frame-bar, parallel with the bar $B^4$, being secured and supported in a similar manner by the post $b^{40}$ and the forward end of the bar $B^6$.

C' and $C^2$ are the elevator driving and carrying shafts, provided with suitable journal-bearings in the elevator-frame bars $B^4$ and $B^7$, rear and front. Upon the shafts C' and $C^2$ are fixed sprocket-wheels $C^{10}$ and $C^{20}$, respectively, and around said sprocket-wheels the elevator-chains D are carried, traveling upward on the lower side. Said chains are provided with teeth or fingers D' at short intervals, said teeth being of considerable length and reaching to the board $B^3$ when passing upward over said board. Said board $B^3$ has formed on its upper surface the concave grooves $b^3$ underneath the path of the teeth or fingers D'. The purpose of thus forming the board $B^3$ is to diminish the friction of the stalks, which, to some extent, rest upon it as they are moved upward by the conveying or elevating mechanism, as hereinafter described, the stalks in that action resting upon the ridges between the grooves.

E E E are brackets secured to a fore-and-aft bar, B$^5$, of the frame, said bar being located a little beyond the upper end of the elevator. Said brackets extend each an arm, E', downward and inward to a line below and stubbleward from the upper elevator-chain wheels, C$^2$, said arms being near the vertical planes of said wheels, respectively. To the ends of the arms E' are connected the bars or rods F, which extend thence in a direction substantially parallel with the lower course of the chains D, and thence around under the shaft C', keeping their distance from the chains substantially as during the first part of their course to the plane which contains the axes of the shafts C' and C$^2$, and thence extending obliquely upward and grainward and being secured to the bar B$^{10}$ of the divider-frame. These several bars F are parallel to each other and to the vertical planes of the chains D, in or closely adjacent to which planes they are respectively located. In their first-described position, underneath the elevator, they are nearer to the plane in which the chains travel than the length of the teeth D', so that said teeth protrude past them or through the plane in which they all lie. It will be seen that these bars, or such portion of them as would be included below a horizontal plane passing through their grainward ends, form a cradle in which the shaft C' and the sprocket-wheels thereon are located and down into which the elevator-chains carry their teeth D', which thus travel through and up out of said cradle, passing between the said bars F in so doing. It will be observed, also, that the divider guide-board B$^{11}$, which constitutes the top of the divider-frame, overhangs the point of attachment of said bars F to the divider-frame.

The stubble-side divider consists of a frame comprising an upper board or bar, G, and a lower board, G', which are secured together by means of a bracket, G$^3$, which affords bearings for the gatherer-driving mechanism, hereinafter described. These two boards diverge rearwardly in a vertical plane, the board G extending upward and rearward to a point rearward of the vertical plane of the sickle, and having braces which secure it to the frame-work of the harvester at any convenient points, and the board G' extending downward and rearward to the forward sill, to which it is made fast. This divider constitutes the frame for the gatherer. Said gatherer consists of the endless chain H, which is carried around the sprocket-wheels H' and H$^2$, the latter of which is fixed on a shaft journaled in a bracket, h$^2$, secured on the under side of the board G at its rear upper end, so that the wheel H$^2$ is in a direct vertical plane rearward from the wheel H'. The gatherer-chain H is provided with fingers h, which gather the standing stalks. The sprocket-wheel H' is of such diameter and so located with respect to the forward ends of the boards G and G' and the fingers h are of such length that said fingers project beyond said boards and are preferably long enough to extend across the space which intervenes between the vertical plane of the grainward edges of said boards and the vertical plane of the stubbleward edge of the grainward divider B. Both the divider B and the divider made up of the boards G and G', and therefore the gatherer, which is between said boards, extend well forward of the vertical plane of the finger-bar. The rearward—that is to say, the delivery—end of the gatherer, it will be seen, overhangs the forward portion of the cradle which is formed by the bars F, and overhangs also the lower or grainward—that is to say, the receiving—end of the foremost elevator-chain D. There is illustrated in the drawings a supplemental device consisting of the chain H$^3$, which is carried around sprocket-wheels H$^9$ H$^{90}$, which are journaled in bearings provided upon the frame-board G$^2$, which is supported by an extension, h$^{20}$, of the bracket h$^2$, said chain having fingers h$^3$ to feed the stalks rearward. This supplemental device forms no part of my invention, but is shown to complete the illustration of the stalk-feeding mechanism.

At the upper end of the elevator composed of the chains D, and a little stubbleward from their delivery end, are located the husking-rolls K K, which may be of any familiar construction, and are journaled in the brackets K' K', hereinabove described, and at the forward part of the elevator, preferably about in line with the forward elevator-chain and operating at the delivery end of that chain and between it and the husking-rollers, are the packers M M, which are in construction and action similar to the familiar form of oscillating and reciprocating packers for grain-binders. In so far as they differ from such packers they are not my invention; but they sustain an important relation to my elevating mechanism, and I design to claim them only in respect to that relation.

As illustrated, the packers operate in vertical planes rearward of the vertical plane of the elevator-chain D, and their reach is such that they pass downward just inward from the delivery-point of the chain, sweeping below the plane of the rods F and upward—that is to say, toward the husking-rolls—coming up quite close to the latter, into which they thus deliver the stalks which they engage and take from the elevator.

Power may be communicated to the mechanism hereinabove described by the following train: The forward end of the shaft k' of the lower husking-roll is provided with a sprocket-wheel, m, to which power is communicated from the harvester driving-train. The gear-wheel M' on the shaft k' of the lower husking-roll meshes with the gear M$^2$ on the shaft of the upper husking-roll and drives the latter. At the rear end of the shaft of the upper husking-roll there is secured the sprocket-wheel $M^5$, which, by means of the chain $m^6$ passing around it and the sprocket-wheel $M^6$, which is on the rear end of the shaft $C^2$, drives said shaft, and thereby the elevating mechanism. Upon the forward end of said shaft there is fixed the sprocket-wheel $C^{21}$, and a chain, $c^{21}$, passes around said sprocket-wheel and around the sprocket-wheel $H^4$, which is fast on the shaft $h^4$, which is journaled at the rear end in the bracket $h^{40}$ on the front sill and at the forward end in the bracket $G^3$, which secures together the boards G and G' of the stubbleward divider. The bevel gear-wheel $H^5$ on the forward end of the shaft $h^4$ meshes with and drives the bevel gear-wheel $H^6$, which is fast on the shaft $h^6$, journaled in the bracket $G^3$, and having fast on its upper end, as above stated, the sprocket-wheel H', which drives the gatherer-chain H. Rigid with the sprocket-wheel $H^2$, at the upper end of the stubbleward divider, is the gear-wheel $H^7$, which meshes with and drives the bevel gear-wheel $H^8$, which has integral with it the sprocket-wheel $H^9$, which drives the supplemental feeding-chain $H^3$, passing around it and around the sprocket-wheel $H^{90}$, journaled at the rear end of the board $G^2$. At the extreme forward end of the shaft of the upper husking-roll is fixed a small sprocket-wheel, $M^3$, which drives the chain $m^3$, which passes around the sprocket-wheel $M^4$, which is fixed on the smaller end of the packer-shaft $m^4$, which is journaled in the brackets $m^{40}$, secured to the bar $B^6$. For the purpose of supporting the guiding-links $m^{100}$ of the packers, and for other purposes not material to my invention, I provide the board $K^{11}$, secured upon the flanges $K^{10}$, projecting outwardly from the brackets K'.

A minor feature—but one of some importance, nevertheless—of my elevator is the series of stalk-guides, made up of the parts L and L'.

L' are flat bars, which are secured at one end to the frame-bar $B^6$, which is above the husking-rollers. Thence said bars extend underneath the shaft $C^2$, between the vertical planes of the chain-wheels, and after passing by said wheels they are bent aside, so that they are immediately above the lower ply of said chains, respectively. Thence they are provided with continuations in the form of the bars L, which are bolted to them, respectively, said bars extending along above the lower ply of the chains, respectively, and serving as tracks for the chains to travel against, and thereby operating as a positive check to the stalks and preventing them from causing the chains to yield upward between the chain-wheels $C^{10}$ $C^{20}$ when the quantity of stalks is great. Said bars, by thus keeping the chains down, cause the teeth or fingers D' of the chains always to extend entirely across or through the path or passage-way— or "throat," as it might be called—of the elevator—that is to say, the space between the bars F and the bars L—so that the fingers never lose their grip upon the stalks once engaged by them. The bars L, in addition to being attached at their upper ends to the bars L', are each fastened near the lower end to the cross-bar $B^{10}$, which is secured to the elevator-frame bars $B^4$ and $B^7$ at front and rear. It should be further noticed that the brackets E have their arms E' curved in a vertical plane in such manner toward the elevator as to form a slight concavity or pocket at the delivery end of the elevator, and that the row of bars L' overhang the row of said brackets E, whereby there is formed between the brackets and the series of bars L' a throatway or temporary receptacle, $e$, in which the stalks may be lodged slightly, and from which they are dislodged by the action of the packers forwarding their butt-ends into the husking-rolls, which thereupon draw them through and out of said throat.

As further guides for the stalks in their passage up the elevator, I provide the boards $B^8$, which are set edgewise and secured to the cross-bar $B^{10}$, said cross-bar passing through each of them, as seen in Figs. 2 and 3. These boards $B^8$ extend parallel to the chains D—one alongside of each chain and comparatively close thereto. They are therefore of necessity pierced for the shafts C' and $C^2$, and may fit said shafts closely enough to be partly sustained by them, the bar $B^{10}$, however, serving to prevent them moving longitudinally with respect to the shafts, and holding them, therefore, in their proper relation to the chains respectively. These boards are of such width as to extend beyond the chains a short distance, their edges, however, being substantially parallel with the course of the chains throughout, as most clearly seen in Fig. 1. Their lower edges and lower and stubbleward ends therefore are parallel, substantially, to the bars F, and said edges being all in the same plane—that is to say, the boards being all the same width and shape—there is formed between their edges and the bars F a definite and fixed throatway, through which the teeth D' of the chains protrude. The boards therefore extending beyond the chains prevent the stalks from riding directly upon the chains, except as occasionally a broken stalk or protruding ear between the boards may be forced up against the chains, in which case the bars L operate, as described, to prevent the chain from yielding up away from the bars F.

The operation of this invention I will now describe.

When the stalks of corn are engaged by the gatherer H, they are first caused to lean over to the rear, so that when severed by the sickle they are in a leaning position overhanging the receiving end of the elevator-chains and partly overhanging the cradle formed by the bars F, and as soon as they have been severed the butt-end will be seized by the forward elevator-chain and carried down into said cradle and thence upward, the butt-ends thus getting somewhat the start of the heads, so that the stalks pass up through the elevator guided and sustained by the bars F and carried by the teeth D' in a position such that the butts with certainty enter the husking-rolls first. The action of the packers located at the forward end serves, further, to insure the same result, but it is dependent mainly upon the fact that the elevator-chains hang into the cradle in which the stalks fall, and therefore seize the butts first because the butts are nearest to the receiving end of the elevator-chains, or, stated otherwise, because they are in a leaning position when they are seized by the elevator-chains, and that leaning position leads to a reversed inclined position upon the bars F when the stalks have been carried around under the chains. It is dependent, also, upon the fact that the receiving-cradle formed by the bars F is located in the rear of the sickle—that is to say, upon the fact that the bars F extend grainward across the path of the incoming stalks and terminate at a line grainward from the fore-and-aft vertical plane of the stubbleward or stalk-guiding edge of the grainward divider. It is preferable, also, that the elevator-chains should be located as illustrated, with their receiving end in direct line rearward from the sickle, so that the stalks fall directly upon them or upon their teeth, though the device would be operative for many conditions of corn merely by virtue of the position of the bars F and the cradle which they form being as described, whereby the stalks falling upon them would be guided in their fall so as to be engaged by the elevator-chains in the manner described. When the stalks enter the husking-rolls, as stated, butt first, the ears of necessity enter the rolls stem first, and approximately endwise, from which it results that the ear is broken from its stem or from the stalk by the grasp of the rolls, which at the same time seize the husk-leaves at the base of the ear and draw them through, thus husking the ear by slipping it out endwise from its enveloping shell or husk, and being thus grasped at the base of the leaves all the husks are necessarily engaged and stripped from the ear by the same movement which breaks the stem and frees the ear, so that partial husking, which results from any construction in which the husk-leaves are engaged sidewise or at their tip ends, is rendered substantially impossible; also, the ear is much less liable to become engaged by the rolls and shelled than if it were allowed to approach them sidewise or point foremost. The result is not only that the stalks are more easily drawn through the husking-rolls than they would be if they were presented sidewise the whole length at once, and that the ears are detached with greater certainty at the very base of the cob and with less danger of leaving a piece of the stem or stalk attached thereto than by the rolls seizing the stalk head first, but also that the ears of corn are more thoroughly husked and less shelled.

The device which I have herein called the "elevator" might be more properly termed a "conveyer," since its action does not require that it should be so placed as to elevate the stalks after taking them out of the cradle, and I design it to be used regardless of the degree of elevation effected by it. It is obvious, also, that its operativeness as a conveyer is independent of its relation with the husking-rolls, although its merit and greatest value, perhaps, are found in its adaptation to the purpose of delivering the stalks to such rolls; but it is well adapted to deliver them to any other mechanism, as to a binder.

For use in some conditions of corn the cradle and throat formed by the bars F will be equally well formed if instead of those bars a continuous sheet-iron or wooden deck or table of the same form is substituted.

The parts of the corn-harvester which are shown in the drawings, other than those which are claimed, pertain to a corn-harvester which is shown in the applications of John A. Stone and William Deering, Nos. 265,262 and 264,987, respectively, filed simultaneously herewith, and I hereby disclaim the same.

I claim—

1. In a corn-harvester, in combination with the sickle, an open-topped cradle or stalk-receptacle located immediately in the rear of the sickle and having its bottom extended stubbleward to form a guide for the stalks, and a conveying mechanism overhanging the stalk-receptacle and the stubbleward extension thereof and traveling in vertical planes and moving stubbleward in its lower course, substantially as set forth.

2. In a corn-harvester, in combination with the sickle, an open-topped cradle or stalk-receptacle located immediately in the rear of the sickle and having its bottom extended stubbleward to guide the delivery of the stalks, and a conveying mechanism comprising endless chains overhanging said receptacle and traveling in vertical planes and moving stubbleward in their lower course, the grainward or receiving end of said chains being located in direct line rearward from the sickle, substantially as set forth.

3. In a corn-harvester, in combination with the sickle and grainward divider, an open-topped stalk-receptacle located immediately in the rear of the sickle and having its grainward edge located as far grainward as the vertical plane of the stubbleward edge of said divider and considerably above the level of the sickle, the boundary of said receptacle extending thence downward and thence stubbleward, whereby said receptacle constitutes a cradle to receive the stalks from the sickle, and a conveying mechanism comprising endless toothed chains traveling in vertical planes and moving stubbleward in their lower course, their receiving or grainward end overhanging said stalk-receptacle, substantially as set forth.

4. In a corn-harvester, in combination with the sickle, a stalk-receptacle located immediately in the rear of the sickle, comprising a series of parallel bars located one behind the other in the rear of the vertical plane of the sickle and extending stubbleward across the path of the incoming stalks, and conveying-chains overhanging such receptacle and having teeth depending between said bars, such chains traveling stubbleward in their lower course, substantially as set forth.

5. In combination with the sickle, a stalk-receptacle located immediately in the rear thereof, comprising a series of parallel bars located one behind the other in rear of the vertical plane of the sickle, each commencing at a point grainward from the path of the incoming stalks and considerably above the level of the sickle and extending thence downward and stubbleward to form a cradle to receive and guide the stalks as they fall from the sickle, and a series of conveying-chains overhanging said series of parallel bars and having teeth depending between them and traveling stubbleward in their lower course, substantially as set forth.

6. In a corn-harvester, in combination with the sickle, the outside divider-frame, the parallel bars F, secured to the upper portion of said divider-frame in a series one behind another, the foremost bar being located a short distance rearward from the vertical plane of the sickle and without intervening mechanism, said bars extending from said divider-frame downward and stubbleward in the rear of the vertical plane of the sickle, and thence farther stubbleward beyond the vertical plane of the stubbleward end of the sickle, and suitably secured to the harvester frame-work, and the conveying-chains overhanging said series of bars throughout the last-mentioned portion of their extent, whereby the stalks severed by the sickle and falling upon the downward and stubbleward portion of said bars are by said portion guided within reach of said chains and thence farther conveyed by the latter, substantially as set forth.

7. In a corn-harvester, in combination with the stalk-receptacle in the rear of the sickle, having its bottom extended stubbleward to support and guide the stalks, conveying mechanism overhanging said extension, and the bars L', located and extending substantially parallel to said extension and overhanging the same, forming a rigid throat for the passage of the stalks, the conveying mechanism comprising chains which have teeth projecting into said throat, substantially as set forth.

8. In combination, substantially as set forth, the parallel bars F, forming a stalk-receptacle in the rear of the sickle and extending thence stubbleward and upward, the elevating mechanism comprising chains traveling in vertical planes parallel with said bars and overhanging the same, and the receptacle e, located beyond the delivery end of the elevating mechanism, substantially as set forth.

9. In combination, substantially as set forth, the harvester-frame comprising the grainward divider-frame and a fore-and-aft bar located at a distance stubbleward from said divider-frame, the parallel bars F, secured one end to the upper part of said divider-frame and connected at the other end to said fore-and-aft bar and depressed between said divider-frame and said fore-and-aft bar to form a stalk-receptacle, and the conveying-chains overhanging said series of bars F, the receiving end of said conveying-chains being located in said depression, substantially as set forth.

10. In combination, substantially as set forth, a harvester-frame comprising the grainward divider-frame and a fore-and-aft bar located at a distance stubbleward from said divider-frame, the parallel bars F, and the brackets E, the former secured at the grain end to the upper portion of said divider-frame and the latter secured at the stubble end to said fore-and-aft bars, the stubble end of the bars F being secured, respectively, to the brackets E, the bars F being depressed between said divider-frame and said fore-and-aft bar to form a stalk-receptacle behind the sickle, and said brackets being upwardly concave between their ends to form a secondary receptacle, and conveying mechanism overhanging the bars F and operating between said receptacles, substantially as set forth.

11. In a corn-harvester, in combination with the gatherer and the sickle, a stalk receptacle or cradle located in the rear of the sickle and endless conveying-chains overhanging said receptacle and traveling stubbleward in their lower course, substantially as set forth.

12. In combination with the sickle, the gatherer operating from a point forward of the vertical plane of the sickle rearward past said vertical plane, a stalk-receptacle in the rear of the sickle, overhung at its forward end by the gatherer, and a conveying mechanism overhanging said receptacle and operating stubbleward therefrom, substantially as set forth.

13. In combination with the sickle, a stalk-receptacle in the rear thereof, and conveying-chains overhanging the receptacle and traveling stubbleward in their lower course, the receiving end of said chains being in the path of the incoming stalks, the gatherer having its delivery end overhanging the forward chain and the receptacle, substantially as set forth.

14. In combination with the sickle, a series of parallel bars extending from a line grainward of the path of the incoming stalks stubbleward across said path, a series of conveying-chains overhanging said series of bars and operating stubbleward in planes substantially parallel thereto, having their receiving ends in the path of the incoming stalks, and the gatherer operating from a point forward of the vertical plane of the sickle to a point in the rear of said plane and overhanging at its said rear end the foremost of said conveying-chains, substantially as set forth.

15. In combination with the sickle, the grainward divider-frame, and the stubbleward divider, the bars F, secured to the outside divider-frame considerably above the level of the sickle and sloping thence downward and extending across the path of the incoming stalks behind the sickle to form a receptacle for said stalks, and the conveying-chains overhanging such receptacle, and the gatherer supported upon the inside divider and at its rear end overhanging the foremost of said conveying-chains, substantially as set forth.

16. In combination with the stalk-receptacle behind the sickle and the conveying-chains overhanging the same and operating stubbleward therefrom in their lower course, packers operating near the vertical plane of the foremost of said chains at its delivery end, substantially as set forth.

17. In combination with a stalk-receptacle in the rear of the sickle, the overhanging elevating-chains operating stubbleward therefrom, and the receptacle e at the delivery end of said elevating-chains, the packers located and operating in the vertical plane of the foremost of said elevating-chains and overhanging said receptacle e, substantially as set forth.

JOHN F. STEWARD.

Witnesses:
T. G. STALLSMITH,
M. E. HOLTON.